Dec. 26, 1922. 1,439,845

L. SEIB ET AL.
PISTON RING EXPANDER.
FILED NOV. 14, 1921.

Inventor:
Louis Seib.
Rudolph Brunner

By

Attorneys.

Patented Dec. 26, 1922.

1,439,845

UNITED STATES PATENT OFFICE.

LOUIS SEIB AND RUDOLPH BRUNNER, OF CHICAGO, ILLINOIS.

PISTON-RING EXPANDER.

Application filed November 14, 1921. Serial No. 515,079.

*To all whom it may concern:*

Be it known that we, LOUIS SEIB and RUDOLPH BRUNNER, citizens of the United States, residing at Chicago, in the county of Cook and State of Illinois, have invented new and useful Improvements in Piston-Ring Expanders, of which the following is a specification.

This invention relates to piston rings employed in connection with internal-combustion engine pistons, and its object is to render the rings leak-proof and thus prevent loss of compression, and escape of oil past the pistons.

The object stated is attained by means of an expander device of novel and improved form which is placed behind the ring and operates to maintain at all times a proper sealing contact between the same and the cylinder wall.

Figure 1:
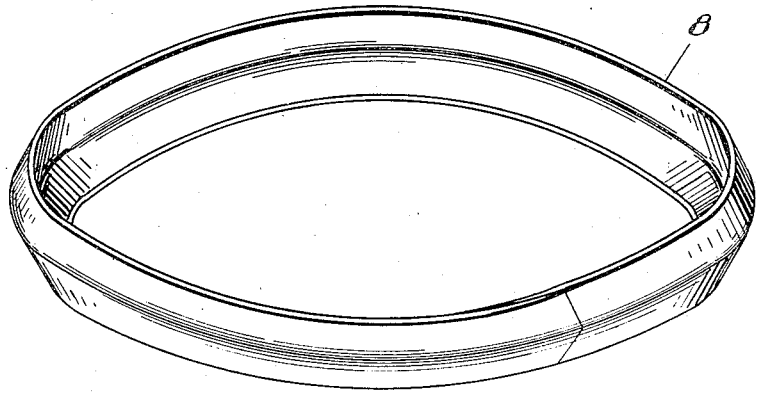
Figure 2:
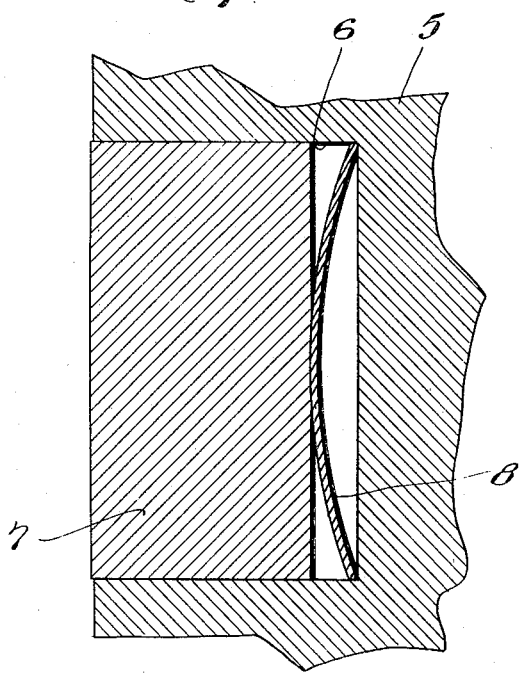
Figure 3:
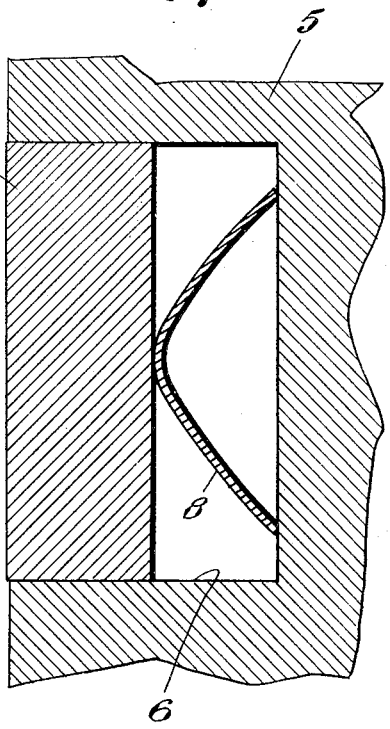

In order that the invention may be better understood, reference is had to the accompanying drawing, wherein:

Figure 1 is a perspective view of the device, and Figs. 2 and 3 are cross-sections thereof showing the same in place.

Referring specifically to the drawing, 5 denotes a fragment of an internal-combustion engine piston which is circumferentially grooved as usual to provide a seat for packing rings. Figs. 2 and 3 show one of the piston ring grooves at 6, and at 7 is shown in cross-section the ring seating in said groove. The piston ring is of the usual type, and it will be understood that the piston is provided with the usual number of rings. However, one ring only has been illustrated as this suffices for a complete understanding of the invention.

In order to maintain the sealing contact between the ring 7 and the wall of the cylinder (not shown) against which said ring bears with its outer periphery, there is mounted in the groove 6, behind the ring, an expander which will now be described.

The expander device is a ring 8 which has a bowed cross-sectional contour, and is resilient transversely so that if force is applied to it in a direction to flatten it out, it will automatically again assume a bowed cross-sectional form when such force ceases to act. The expander ring 8 is first placed in the piston groove 6, and then the packing ring 7 is applied to encircle the expander ring externally. This positions the expander ring inside the piston ring. The expander ring is so positioned that its top and bottom edges engage the wall of the piston groove, whereas its portion intermediate said edges is in contact with the inner periphery of the piston ring. When the expander ring is first placed in the piston groove and a piston ring which has not worn is fitted, the expander ring is compressed or partly flattened out as shown in Fig. 2, so that its inherent tendency to reassume its bowed form produces a pressure against the rear periphery of the piston ring in a direction to expand the latter ring and hold it firmly in contact against the cylinder wall. As the outer periphery of the piston ring wears down, this wear is automatically taken up by the expander ring, and the sealing contact between the piston ring and the cylinder wall is thus maintained. Fig. 3 shows somewhat exaggerated, a worn piston ring, and how the expander ring has assumed its normal bowed cross-sectional contour in expanding the piston ring. It will also be noted by reference to Fig. 3, that the expander ring so seats in the piston groove 6 as to prevent leakage of compression and oil by the way of said groove. This sealing action is obtained by the firm and intimate contact of the edges of the expander ring with the wall of the piston groove, and the contact between the ring and the inner periphery of the piston ring.

The expander ring can be easily and cheaply manufactured, and it can be used with any ordinary type of piston ring. As shown in Fig. 1, the expander ring is split, and its ends beveled to make a smooth joint.

We claim:

1. A piston ring expander comprising a ring adapted to seat inside the piston ring, and having a bowed cross-sectional contour to engage the piston ring and the wall of the groove in which the piston ring seats, said expander ring being resilient transversely and having an inherent tendency to maintain its bowed cross-sectional contour.

2. A piston ring expander comprising a ring adapted to seat inside the piston ring, and having a bowed cross-sectional contour, said expander ring being resilient transversely and having an inherent tendency to maintain its bowed cross-sectional contour, the top and bottom edges of the expander ring being adapted to engage the piston ring groove and the portion of the expander ring intermediate said edges being adapted to engage the inner periphery of the piston ring.

In testimony whereof we affix our signatures.

LOUIS SEIB.
RUDOLPH BRUNNER.